W. WOOD.
COVER HOLDER FOR COFFEE AND TEA POTS.
APPLICATION FILED FEB. 27, 1911.

1,044,114.

Patented Nov. 12, 1912.

Witnesses:

Inventor.
William Wood
by Herbert W. P. Jenner
Attorney.

UNITED STATES PATENT OFFICE.

WILLIAM WOOD, OF STOKE-UPON-TRENT, ENGLAND.

COVER-HOLDER FOR COFFEE AND TEA POTS.

1,044,114.   Specification of Letters Patent.   Patented Nov. 12, 1912.

Application filed February 27, 1911. Serial No. 611,283.

*To all whom it may concern:*

Be it known that I, WILLIAM WOOD, subject of the King of Great Britain and Ireland, and resident of Stoke-upon-Trent, in the county of Stafford, England, potter's manager, have invented a certain new and useful Cover-Holder for Coffee and Tea Pots, of which the following is a specification.

My invention relates to improvements in or in connection with the covers or lids of teapots, coffee pots, cocoa jugs and other like pots or jugs provided with a loose lid which is liable to fall away when the pot is tilted into a more or less horizontal position, the object of my invention being to provide a simple device for preventing the lids falling away and becoming broken, while at the same time admitting of such lids being removed from the pot in the ordinary way, when required.

My invention consists essentially of a bar or frame pivoted to the teapot and extending over the lid toward the handle of the pot to allow it to be gripped and held in position during the time the pot is in use while enabling the lid to be removed easily and quickly when required.

My invention will be fully described with reference to the accompanying drawings which show its application to a teapot though it will be understood that the construction indicated may be varied slightly when applied to other pots, jugs or the like.

Figure 1:
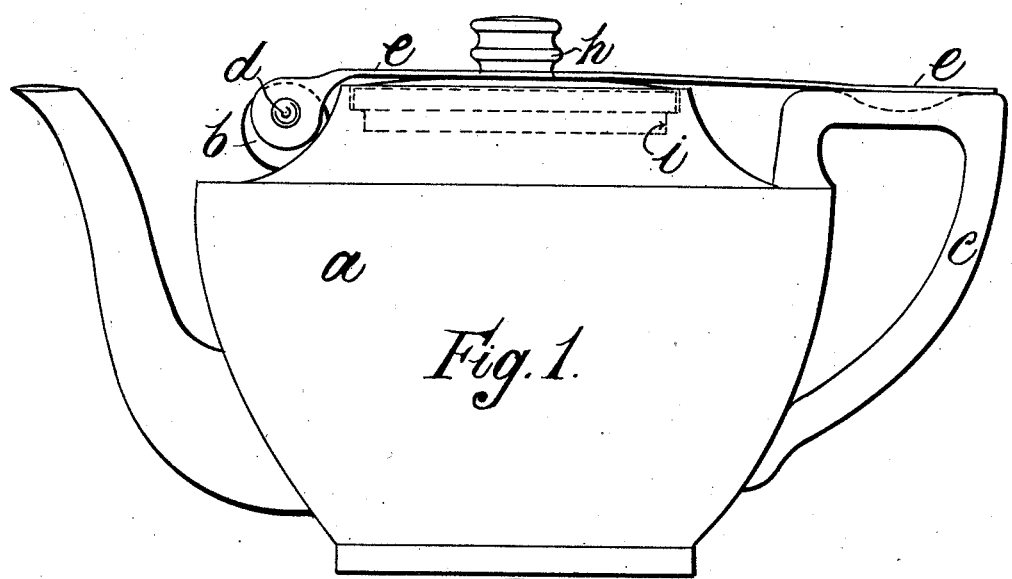
Figure 2:
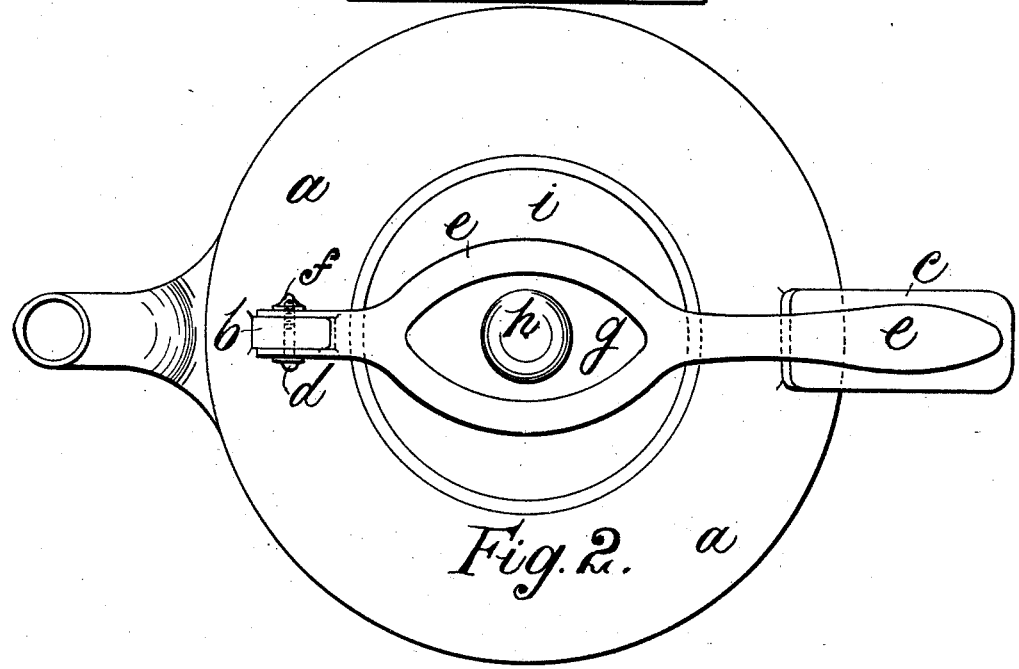
Figure 3:
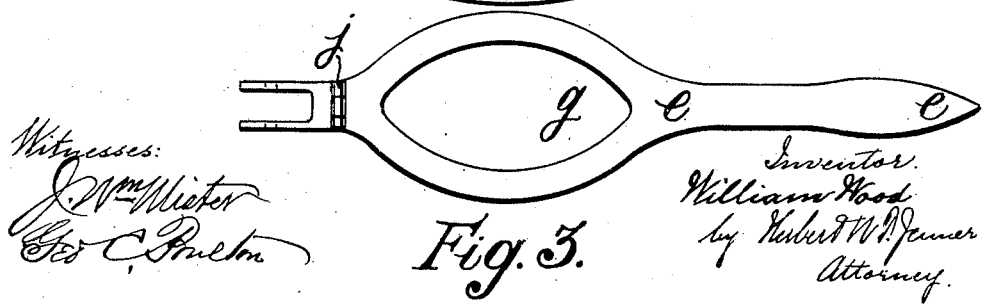

In the aforesaid drawings, Figure 1 indicates a side elevation of a teapot showing my invention applied thereto, Fig. 2 is a plan view of the same. Fig. 3 is a plan view of the retaining frame showing a modification.

In the accompanying drawings *a* indicates a teapot of usual construction but which in accordance with my invention has formed integral with it a lug or projection *b* at its upper portion and usually diametrically opposite the handle *c*, such lug being provided with a hole adapted to receive a pin *d*, screw or the like forming a pivot for a lever or frame *e*. The pivot is usually one which can be easily removed. In the drawings it consists of a bolt or screwed pin provided with a head at one end and at the other with a nut *f*. The lever or frame *e* is provided at the center with a hole *g* to stand perfectly clear of the usual knob *h* forming part of the lid *i*, which latter is loosely placed in the teapot as usual. The lever or frame *e* extends fully across the pot and over the handle *c* as indicated.

In Fig. 3 instead of pivoting the lever or frame *e* directly on the pivot pin *d* it is made in two parts and hinged at *j*.

I would have it understood that the lever or frame may be made of any suitable material or combination of materials so long as it has the effect hereinbefore stated of holding the lid securely in position when the teapot is being emptied of its contents by pouring, the lever being held in position against the handle *c* during the time the latter is gripped. In the drawings the lever *e* is shown forked at its pivoted end. The lever or retaining frame may however be pivotally connected with the body of the vessel in any other approved manner.

By turning the lever *e* about its pivot pin *d* the lid *i* may be removed in the usual manner while the lever itself can also be easily removed by withdrawing its pivot pin, when desired.

What I claim as my invention and desire to secure by Letters Patent is:—

The combination, with a tea-pot having a pouring spout, a handle, and an integrally formed lug projecting from its upper part between its main opening and its spout; of a cover provided with a knob, and a retaining arm pivotally connected to the said lug and provided with a perforated enlargement for bearing on the cover around its knob, said arm having a thumb-piece at its free end which rests on the top of the said handle.

In testimony whereof I have hereunto set my hand in the presence of two witnesses.

WILLIAM WOOD.

Witnesses:
P. PLANT,
I. BENTON.